United States Patent
Reinhold et al.

(10) Patent No.: US 11,505,847 B2
(45) Date of Patent: Nov. 22, 2022

(54) METHOD AND APPARATUS FOR GA-RECOVERY

(71) Applicants: Freiberger Compound Materials GMBH, Freiberg (DE); Helmholtz-Zentrum Dresden-Rossendorf E.V., Dresden (DE); Technische Universität Bergakademie Freiberg, Freiberg (DE)

(72) Inventors: Thomas Reinhold, Freiberg (DE); Stefan Eichler, Dresden (DE); Berndt Weinert, Freiberg (DE); Oliver Zeidler, Schwerte (DE); Michael Stelter, Wegefarth (DE)

(73) Assignee: FREIBERGER COMPOUND MATERIALS GMBH, Freiberg (DE)

( * ) Notice: Subject to any disclaimer, the term of this patent is extended or adjusted under 35 U.S.C. 154(b) by 861 days.

(21) Appl. No.: 16/309,473

(22) PCT Filed: Jun. 13, 2017

(86) PCT No.: PCT/EP2017/064371
§ 371 (c)(1),
(2) Date: Dec. 13, 2018

(87) PCT Pub. No.: WO2017/216144
PCT Pub. Date: Dec. 21, 2017

(65) Prior Publication Data
US 2019/0161826 A1 May 30, 2019

(30) Foreign Application Priority Data
Jun. 13, 2016 (DE) .................. 10 2016 210 451.9

(51) Int. Cl.
*C22B 58/00* (2006.01)
*C22B 3/44* (2006.01)
(Continued)

(52) U.S. Cl.
CPC ............ *C22B 58/00* (2013.01); *C22B 3/42* (2013.01); *C22B 3/44* (2013.01); *C22B 7/006* (2013.01); *Y02P 10/20* (2015.11)

(58) Field of Classification Search
CPC .. C22B 3/42; C22B 3/44; C22B 58/00; C22B 7/006; Y02P 10/20
(Continued)

(56) References Cited

U.S. PATENT DOCUMENTS 4,844,808 A * 7/1989 Sabot ..................... C22B 3/42
423/112
5,972,073 A  10/1999 Sturgill et al.
(Continued)

FOREIGN PATENT DOCUMENTS

| CN | 104962743 | 10/2015 |
| JP | 60002636 | 1/1985 |

(Continued)

OTHER PUBLICATIONS

Japanese Office Action dated Mar. 30, 2021 for Application No. 2018-564950 filed Dec. 11, 2018.
(Continued)

*Primary Examiner* — Jie Yang
(74) *Attorney, Agent, or Firm* — A.C. Entis-IP Ltd.; Allan C. Entis (57) ABSTRACT

The present invention encompasses a method of selectively separating Ga from wastewaters with the aid of a dialysis method. This exploits the particular complexation behaviour of Ga, which forms an unstable tetrahalo complex. This forms only in the case of a sufficiently high halide concentration. Since the halide concentration becomes lower across the membrane, the Ga-tetrahalo complex breaks down in the membrane, as a result of which the Ga is retained. Other metals such as In and Fe do not show this behaviour, and
(Continued)

therefore the tetrahalo complexes of these metals can pass through the membrane and hence can be selectively separated off.

20 Claims, 7 Drawing Sheets (51) Int. Cl.
C22B 7/00 (2006.01)
C22B 3/42 (2006.01)

(58) Field of Classification Search
USPC .......................................................... 75/407
See application file for complete search history.

(56) References Cited

U.S. PATENT DOCUMENTS

2004/0042945 A1* 3/2004 Rao ........................ C22B 58/00
423/122
2010/0329970 A1 12/2010 Lain et al.

FOREIGN PATENT DOCUMENTS

JP 11172024 6/1999
JP 2009226300 10/2009

OTHER PUBLICATIONS

German Office Action dated Feb. 16, 2017 for German Application 102016210451.9 filed on Jun. 13, 2016.
PCT International Search Report and Written Opinion dated Jul. 27, 2017 for PCT/EP2017/064371 filed on Jun. 13, 2017.
Yamashita et al., Recovery of Individual Metals from Gallium-Arsenic-Indium Semiconductor Wastes by Flotation, Analytical Sciences, vol. 6, 1990, pp. 783-784.
Tsai et al., Separation of Gallium and Arsenic in Wafer Grinding Extraction Solution Using a Supported Liquid Membrane that Contains PC88A as a Carrier, Journal of Environmental Science and Health, Part A, 40(2), pp. 477-491.
Kim et al., Recovery of phosphoric acid from mixed waste acids of semiconductor industry by diffusion dialysis and vacuum distillation, Separation and Purification Technology, 90, 2012, pp. 64-68.
Zeidler Oliver. Dialyseverfahren zum Recycling von Gallium, World of Metallurgy—Erzmetall, 67 (2) 2014.
Sata et al., Interaction between anionic polyelectrolytes and anion exchange membranes and change in membrane properties. Journal of Membrane Science, vol. 100, Issue 3, Apr. 28, 1995, pp. 229-238.
Korkisch Johann, Handbook of Ion Exchange Resins: Their Application to Inorganic Analytical Chemistry, vol. VI, 1989.
Brendler et al., Untersuchungem zur Chlorokomplexbildung des Gallium (III)-kations in wäßger Lösung, Monatshefte für Chemie/ChemicalMonthly, 123(4), 1992, pp. 285-289.
Ocken , Erica, Untersuchung zur Protolyse und Chloro-Komplex-Bildung desGallium(III)-Kations, Dissertation an der TU Bergakademie Freiberg, Institutfür Anorganische Chemie, 1990, p. 79.
Schulz, Tina, Die Niere als Vorbild, Entdeckt—Das Forschungsmagazin ausdem HZDR, 2015, 2, pp. 30-31.
Stelter, Michael, Zwei aktuelle Beispiele zum Recycling metallhaltigerWertstoffe—Galliumrecycling aus Prozesslosungen der Halbleiterindustrie,Powerpoint-Presentation, General Assembly, FIRE e.V., Freiberg, Feb. 19, 2015.
Stelter et al., Recycling von Gallium aus Prozessrückstanden; Retrieved from internet: URL:http://www.vivis.de/phocadownload/Downoad/2013 rur/2013 RuR 471_480 Stelter.pdf on Jul. 19, 2017.
Brehm, Sebastian, Polymermembranen, Internet (German), retrieved from the internet: URL:http://www.jenano.de/iomcl4media/de/Skripte/08 Polymermembranen.pdf [found on Jul. 19, 2017].
N.N., European Metallurgical Conference, Jun. 14-17, 2015, GDMB,Precious Metals—Pyrometallurgy/Hydrometallurgy/Recycling/Waste MinorMetals.
Kondziela et al., Determination of Stability Constants of Indium Halogenide Complexes by Polaragraphy, Electroanalytical Chemistry and Interfacial Electrochemistry, 61 (1975) pp. 281-288.
European Office Action dated Jul. 28, 2020 for Application No. 17731117.2 filed Jun. 13, 2017.
O. Zeidler, Optimization of a Dialysis Process for the recycling of gallium, EMC 2015, TU Bergakadamie Freigberg.

* cited by examiner

METHOD AND APPARATUS FOR GA-RECOVERY

RELATED APPLICATIONS

The present application is a U.S. National Phase of PCT Application No. PCT/EP2017/064371, filed on Jun. 13, 2017, which claims the benefit under 35 U.S.C 119(a)-(d) from German application 10 2016 210 451.9, filed on Jun. 13, 2016. The contents and disclosures of these prior applications are incorporated herein by reference.

FIELD OF THE INVENTION

This invention relates to a process for the separation of Ga-containing species from metal and non-metal species forming anions in acidic aqueous solutions, by dialysis with an anion exchanger dialysis membrane.

The process is particularly suitable for the pre-refining of gallium-containing process effluents such as pickling solutions or polishing suspensions from GaAs wafer production in order to enable subsequent gallium recycling. The inventive process enables the processing of impure process waste water with ionic impurity contents to a gallium solution with low impurity contents, allowing a transfer into a purified intermediate product or a direct further processing to elemental gallium.

Gallium itself is only produced in a few aluminum oxide smelters and in campaigns, being a reason why metal prices are subject to fluctuations of between US$ 200 and US$ 2000 per kilogram. For this reason, the recycling of gallium from production residues is of great strategic importance for reducing the need for raw materials.

BACKGROUND

Conventional processes for the pre-refining of gallium in process waste water include, for example, precipitation processes or extraction processes.

As state of the art, U.S. Pat. No. 5,972,073 reveals a process in which a dissolved compound of the fifth main group (e.g. arsenic acid) in the process water of a III-V semiconductor is separated from a dissolved element of the third main group (e.g. gallium) by precipitation. This process comprises adjusting the pH value of the waste water to about 9.5 to 12.5 by an alkali metal hydroxide and adding an alkaline earth metal hydroxide, whereby the compound of the fifth main group precipitates as an insoluble alkaline earth metal salt (e.g. calcium arsenate) which can be separated from the valuable waste water by filtration. The element of the third main group can then be precipitated and separated by adding a mineral acid. A variant of the US patent mentioned above describes the precipitation of calcium arsenate from waste water containing gallium. This process is very complex due to several process stages. The consumption of neutralizing agents such as NaOH and precipitants such as lime milk is very high for strongly acidic waste water.

Other processes that separate the valuable material gallium instead of the impurity arsenic acid are extraction processes. In this process, waste containing GaAs is rendered soluble with hydrochloric acid and hydrogen peroxide. In a subsequent liquid-liquid extraction with methyl isobutyl ketone (MIBK), the gallium accumulates in the extract, whereas the arsenic acid remains in the raffinate. Like the precipitation process, this process is also multistage and involves a high consumption of chemicals (hydrochloric acid, MIBK), and there is the further problem of heavy contamination of the product and waste water with the organic extraction agent.

In Analytical Sciences, October 1990, Vol. 6, p. 783 et seq., Yamashita et al. describe a process for separating metal ions from gallium arsenic indium semiconductor waste by ion flotation. Here, gallium and indium ions could be separated together using N-dodecanoyl-N-methyl-3-aminopropionic acid (DMAP). The process requires the use of costly organic chemicals in four neutralization and flotation stages, which make the process uneconomical. The gallium-containing product is also heavily contaminated with organic chemicals.

In the Journal of Environmental Science and Health, Part A-Toxic/Hazardous Substances and Environmental Engineering (Vol. 40, No. 2, p. 477-491, 2005), Tsai et al. describe a liquid membrane process for Ga separation from an As-containing solution of wafer processing. In a single-stage process with a good selectivity, gallium is extracted through a porous membrane impregnated with the organic extraction chemical PC88A. In this process, however, regular bleeding of the extractant from the membrane occurs, causing the membrane to lose its selectivity. The frequent and time-consuming regeneration of the membrane with extractant makes the entire process inefficient.

Dialysis processes with solid ion exchange membranes are superior to the aforementioned processes because they consume practically no chemicals and the membranes used are highly stable. These processes can be carried out in compact systems. Dialysis processes for the regeneration of alkaline solutions are established in electroplating technology, whereas they can hardly be found in any applications in the semiconductor industry until now.

In Separation Purification Technology 90, 2012, p. 64-68, Kim describes a diffusion dialysis process for the recovery of phosphoric acid from mixed waste solutions from the semiconductor industry. It has been found that diffusion dialysis with anion exchange membranes and subsequent distillation can selectively separate phosphoric acid from metal-containing mixed acids. The phosphoric acid produced can only be separated from aluminum and molybdenum species with an 80% yield. The concentration of the acid obtained remains below 50%, so that it needs to be concentrated by vacuum distillation and separated from accompanying substances such as $HNO_3$ and acetic acid in a second step.

In World of Metallurgy-ERZMETALL 67 (2014) Zeidler describes the application of dialysis processes using the example of the separation of gallium and arsenic with uncoated membranes in spent pickling solutions of GaAs wafer production.

SUMMARY OF THE INVENTION

To date, it has not been possible to perform extensive or even complete selective separation of arsenic acid from gallium species by diffusion dialysis at a technical level, as the selectivity shifted during dialysis. The diffusion rate of the ion species removed from the feed (e.g. $H_2AsO_4^-$ ions of arsenic acid) decreases with decreasing concentrations, while the diffusion rate of the remaining untransported species (e.g. $Ga^{3+}$, $GaCl_4^-$) remains unchanged at the same concentration. An extensive or even complete removal of arsenic acid with concentrations below 3 g/l As ($\approx 0.04$ mol/l) requires e.g. a longer process or larger membrane area or higher solution temperatures, which can increase the gallium loss.

Therefore, the object of this invention was to develop a process in which gallium ions can be separated from impurities such as arsenic acid or metals in low concentrations with high selectivity. This requires in particular an increase of the gallium retention, in particular of anionic gallium complexes.

This object is solved by the methods according to claim 1, by devices according to embodiments of the disclosure provided hereinbelow and by a use according to embodiments of the disclosure provided hereinbelow. Further developments are specified in the disclosure hereinbelow.

Without restricting the invention, a compilation of items describing procedures, subjects, further developments and special features of the present invention shall be given below:

1. A process for separating Ga-containing species from other metal and non-metal species from acidic aqueous solutions using an dialysis process with anion exchange dialysis membrane, wherein an acidic feed stream to be separated contains halide ions in a concentration of at least 2 mol/l and Ga ions in a concentration which enables forming gallium halide complexes, and wherein Ga-ion-containing species are selectively retained in the membrane and the other metal and non-metallic species are transported through the membrane.

2. A process according to item 1, wherein the halide ions are chloride or bromide and can form anionic tetrahalogeno-complexes with gallium.

3. A process according to item 1 or 2, wherein the halide concentration in the feed stream must not fall below a certain stoichiometric ratio to the gallium concentration in order to ensure effective gallium retention by the decomposition of sorbed gallium-halogeno-complexes in the membrane.

From a feed with 0.3 mol/l Ga, gallium-chloro-complexes are formed and sorbed by the membrane, e.g. at $Cl^-$ concentrations of at least 2 mol/l $Cl^-$. Their stability decreases due to the concentration gradient of the Cl ions towards the dialysate.

4. A process according to items 1 to 3, in which anionic Ga-containing species are sorbed by the membrane and their concentration decreases due to the instability of the species in the dialysate direction.

5. A process according to one of the preceding items, wherein the backbone of the anion-exchange dialysis membrane comprises a copolymer with a low degree of crosslinking.

6. A process according to one of the preceding items, wherein the anion exchange dialysis membrane for a Ga retention comprises, at least on the feed side, a modified membrane layer whose membrane copolymer has a higher degree of crosslinking than the backbone of the membrane.

The preferably thin membrane layer on the feed side, for example in the range from 1 μm to 10 μm or 100 μm, displaces the sorption equilibria of the ions and complex ions, thereby in particular reducing the stability of the gallium-halogeno-complexes in the membrane.

7. A process according to any one of items 1 to 5, wherein the anion exchange dialysis membrane for Ga retention at least on the feed side comprises a modified membrane layer, which is produced by impregnation of the surface with weakly basic anion exchange groups.

8. A process according to any one of items 1 to 5, wherein the anion exchange dialysis membrane for Ga retention has a modified membrane layer, at least on the feed side, produced by targeted control of membrane synthesis.

9. Process according to one of the preceding items, the acidic aqueous solution comprising halogen hydracids and optionally other acids such as arsenic acid ($H_3AsO_4$) and nitric acid ($HNO_3$). These acids can be separated by dialysis as impurities of the Ga-containing solution.

10. A process according to one of the previous items, the acidic aqueous solutions in the feed having a pH of ≤3, preferably ≤2.

If the pH rises above 3 due to acid separation, the gallium can be precipitated as hydroxide.

11. A process according to one of the preceding items, in which a gallium halide complex ($GaX_4-$) is present in the feed stream as a Ga-containing species, in particular in the form of $GaX_4-$ with X=Cl, Br, and is selectively retained.

12. A process according to the previous item, wherein the gallium-halo-complex is a gallium-chloro-complex.

13. A process according to item 11 or 12, in which the complexing equilibrium at or in the membrane shifts towards the formation of $Ga^{3+}$ and halide ions.

14. A process according to one of the preceding items, wherein the impurities to be separated from the Ga species are metal and non-metal species capable of permeating the anion exchanger dialysis membrane as acids (preferably $H_2AsO_4$) and tetrahalogeno-complexes $MX_{4-}$ with X=Cl, Br, (preferably with M=In, Fe and rare earths).

15. A process according to the previous item, wherein the permeable tetrahalogeno-complexes are $InCl_4-$ and $FeCl_4-$.

16. A process according to one of the preceding items, in which ion transport through the membrane is carried out by applying an electric voltage.

17. A dialysis cell for carrying out a process according to one of the preceding items, comprising a feed chamber and a dialysate chamber as well as anion exchanger dialysis membranes separating the feed chamber and the dialysate chamber from each other.

18. A dialysis cell according to item 17, comprising, in the case of electrodialysis, an anode and a cathode.

19. A device comprising a plurality of dialysis cells according to one of the two preceding items, the dialysis cells being cascaded to perform selective separation of the impurities of the Ga solution in different concentration ranges. The dialysis cells are preferably operated continuously in countercurrent.

20. A device according to one of the preceding items, the temperature of feed and dialysate being adjustable in order to accelerate mass transfer, preferably when the device is designed as a diffusion dialysis unit.

21. Use of a process according to items 1 to 16 for the separation of Ga and As, for the separation of Ga and In and/or for the separation of Ga and Fe.

DETAILED DESCRIPTION

According to the invention, it was surprisingly found that Ga-containing complexes and species, in contrast to non-metal species and other metal species different from Ga, are retained with high reliability and selectivity and in an controllable manner by an anion exchange membrane, if halide ions in a concentration of at least 2 mol/l are present in the feed in the region flowing up to the anion exchange membrane in an acidic solution of the feed (feed stream) to be separated. In particular, it was surprisingly found that a gallium-halogeno-complex forming in the feed solution ($[GaX_4-]$ with X=Cl or Br)— provided that the above mentioned minimum concentration of the halide ions mentioned above is maintained and is in the correct ratio in combination with the concentration of the Ga ions in the feed stream—is first sorbed in the membrane, but cannot permeate, then selectively disintegrates in the membrane due to the halide gradient between feed and eluate at or in the membrane due to the halide gradient between feed and eluate, and therefore no Ga in the form of the complex passes the membrane, whereas other metal and non-metal species and complexes, as far as they are present with an anionic charge in the feed, remain stable and therefore pass the membrane. The reason for this behavior is the special complexing behavior of gallium, according to which gallium-tetrahalogeno-complexes are unstable below a certain chloride concentration and disintegrate into $Ga^{3+}$ and halide ions without the formation of mixed ligand complexes. At 0.3 mol/l Ga, the minimum concentration for the stability of $GaCl_4-$ is e.g. 2 mol/l Cl. For correspondingly lower Ga concentrations, lower $Cl^-$ concentrations are possible. However, a particularly effective and currently reasonable economic limit is 0.3 mol/l Ga.

A dialysis procedure with the features mentioned above can be used as diffusion dialysis as well as electrodialysis.

For example, arsenic at pH values ≤3 is predominantly present as $H_2AsO_4-$. Metal cations other than Ga form stable halogeno-complexes. Despite the halide concentration gradient prevailing in the membrane, in contrast to the $GaX_4-$ complex, these are decomposed only gradually and to a limited extent, so that the solution of contaminating non-metal species such as arsenic acid and metal complexes such as $InCl_4-$ and $FeCl_4-$ pass through the membrane, whereas gallium is retained highly selectively. For the reasons described, the selectivity of the gallium retention is increased by at least one order of magnitude through the use of coated membranes according to embodiments of the disclosure (see membrane comparison in FIGS. 6A-6B).

The respective substances can then be recovered by suitable conditions or measures. For example, the Ga in the purified feed can be obtained directly by electrolysis or can be precipitated as Ga hydroxide by increasing the pH value—which may be achieved by adding lye or, alternatively, automatically by diffusing the acid into the dialysate. On the other hand, the arsenic acid from the dialysate can be used for wastewater treatment or arsenic recovery, for example by adding iron salts in the low pH range, such as pH=2.

Two different processes can take place at a membrane during dialysis:

Ion exchange at functional groups is an exchange of different ions with charges that are opposite to the functional groups and balance them. Since charge neutrality must be maintained during ion transport, directed charge transport by ion exchange can only occur if an equivalent of opposite charges is also transported in the opposite direction. This would require strong external forces (e.g. the application of an electric field).

During the sorption of ion pairs, the ion exchange resins absorb anions and cations in order to balance the activity of the ions inside and outside the resin. The repulsion forces of the functional groups against equally charged co-ions can be overcome to a limited extent. Anion exchange resins can sorb $H^+$ ions at high concentrations due to their high mobility, which enables, for example, the sorption of large amounts of acid.

The sorbed ions are dissolved in the swollen polymer network. Ion sorption requires strong resin swelling and takes place particularly in the case of slightly crosslinked membrane polymers. Sorption on one membrane surface results in a concentration difference in the membrane that causes diffusion of the ion pairs to the other membrane surface. The selectivity of the ion transport depends on the selectivity of the ion sorption at the membrane surfaces and on the diffusion rate of the ion pairs.

The functional principle of dialysis will be explained more in detail below. The principle of dialysis is based on the selective transport of ions through non-porous membranes coated with ion exchange resins. They are loaded on one side of the membrane and regenerated on the other. Concentration differences between the solutions (diffusion dialysis) or electric fields (electrodialysis) can serve as driving forces for mass transfer. The ion exchange resins of the dialysis membranes are specifically modified in order to influence the membrane selectivity by the exchange equilibrium, the loading kinetics and the transport resistance. The modifications enable continuous separation processes for acids, neutral salts and differently charged ions.

Diffusion dialysis is based on the passive diffusion of coion-counterion-pairs through special diffusion dialysis anion exchange membranes with weakly cross-linked polymers. It is used, for example, in the recovery of mineral acids and alkaline solutions.

In addition to the membranes, which have a service life of several years in operational use, diffusion dialysis consumes water as a receiver medium (dialysate) and a small amount of energy for volume circulation. Furthermore, the membranes can be stacked into compact modules, so that the process works very economically in principle.

In electrodialysis, coions diffuse along the functional groups from which they are exchanged. By applying an external electric field, the chemical potential gradient is superimposed by an electric potential gradient. The current flow through the membrane is effected by electromigration. The alternating separation of the feed and dialysate chambers with electrodialysis anion exchange membranes and electrodialysis cation exchange membranes allows selective separation of the anions and cations from the feed and their accumulation in the dialysate. The rate of migration depends on the current density, so that even small amounts of salt can be quickly removed from the feed.

In diffusion dialysis and electrodialysis membranes, the exchange capacities and crosslinking degrees of the ion exchange resins are targetedly adjusted to generate permeabilities and selectivities for different fields of application. Diffusion dialysis membranes with degrees of crosslinking of 5-10% divinylbenzene (DVB) promote salt diffusion by a high absorption of coions. Electrodialysis membranes are designed to inhibit salt diffusion by crosslinking degrees above 20% DVB.

It was surprisingly found that the selectivity and controllability of the retention of Ga-containing species against permeating through the membrane of other metal and non-metal species to be separated is particularly significantly improved when the anion exchanger membrane used is provided with a copolymer layer that is more cross-linked than the membrane skeleton in order to modify the membrane accordingly on the surface facing the feed. The modified surface membrane layer is relatively thin, preferably in the thickness range up to 100 μm, further preferably up to 10 μm.

There are different types of these functional layers or modifications of the outer surface, and they are characterized by their property of having a weaker swelling than the rest of the ion exchange resin and of sorbing smaller amounts of ions due to the shifting the Donnan equilibrium. For example, long-chain "polyelectrolytes" can be applied (Neosepta series by Tokuyama Soda, see JP19970338354 19971209).

According to Sata (Journal of Membrane Science 100 (1995) 229-238), functional layers can also be produced by impregnating the surface with weakly basic anion exchange groups, which are produced by polycondensation of strongly cross-linked layers on the surface or by partial decomposition of strongly basic anion exchange groups on the membrane surface.

Another possibility for the generation of the functional layer is the production by targeted control of the membrane synthesis.

It is assumed that these special modifications or layers strongly contribute to the fact that in the present invention gallium-halide-complexes are only sorbed at the membrane. Thus, it was surprisingly found that the permselectivity of the negatively charged $GaX_4^-$ complex is significantly increased by functional layers compared to other simply negatively charged anionic complexes (e.g. $InX_4^-$).

Figure 1:
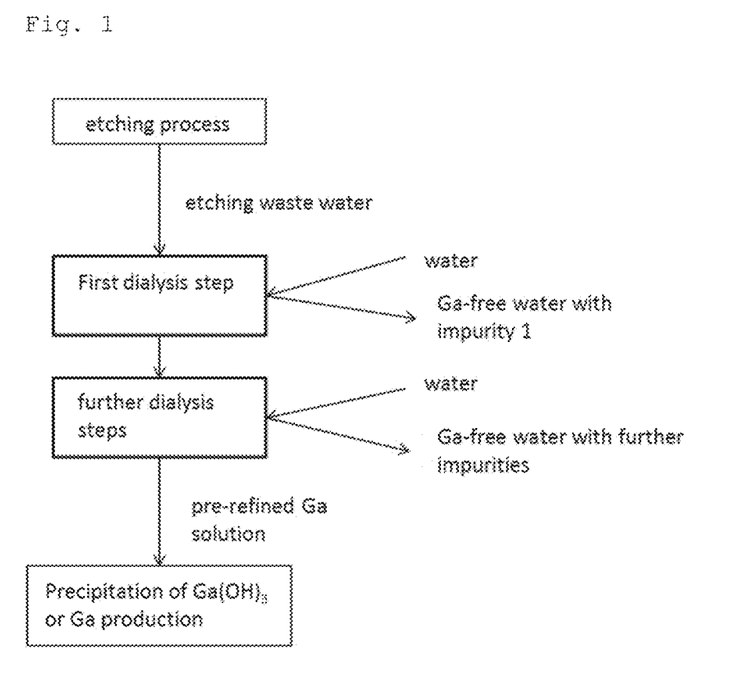

As shown in FIG. 1, an etching effluent containing Ga ions, As-ions, possibly further metal cations and one or more acids (e.g. HCl, $HNO_3$) is to be separated by dialysis processes in one embodiment of the present invention, so that a purified Ga-containing solution is produced for further processing, e.g. by precipitation and recovery of gallium. In this embodiment the ligand is for example X=Cl. The pre-refined solution produced should have the highest possible Ga concentration and be free from impurities such as arsenic acid or metal ions. The separation of arsenic acid and metal ions can take place in several dialysis stages, in which one or more impurities are selectively separated, respectively. The anion exchange membranes mentioned above can be used to diffuse acid anions but retain metal cations and gallium-halogeno-complexes. Korkisch (Handbook of Ion Exchange Resins: Their Application to Inorganic Analytical Chemistry, Vol. VI, CRC Press Boca Raton, Fla., 1989) shows that Ga can form anionic chloro- and bromo-complexes that are exchanged by anion exchange resins.

Figure 2:
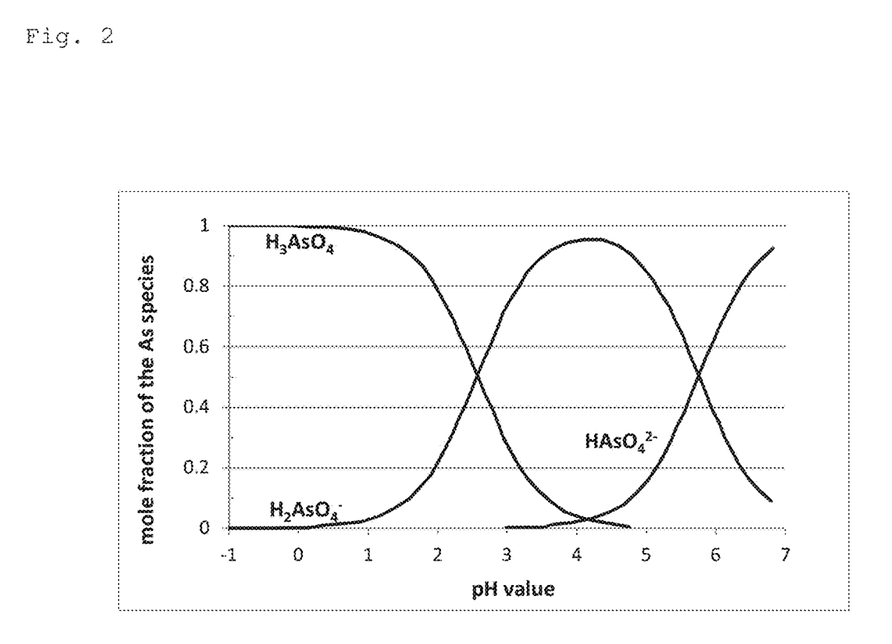

FIG. 2 shows the protolysis equilibrium of the arsenic acid in the feed as a function of the pH value. From pH=0, the concentration of $H_2AsO_4^-$ anions which are permeable through the anion exchange membrane increases. In a membrane, the diffusion rate of arsenic acid would increase significantly, since the pH gradient between feed and dialysate would cause a shift in the protolysis equilibrium within the membrane.

One concept of the present invention is based on the pH value adjustment of etching waste water to pH≤3, preferably ≤2. if the pH value rises above 3 due to acid separation, gallium hydroxide, which sorptively binds arsenic acid, also precipitates in this embodiment. The precipitate can additionally cause a blocking of the membrane.

The basic idea of the present invention is based on the fact that a $GaCl_4^-$-complex (chloro-complex) is formed in a solution with pH≤3 as well as—in this embodiment—with a chloride ion concentration of at least 2 mol/l. This anionic complex could generally pass through an anion exchange membrane. At the same time, anion-exchange membranes can sorb large amounts of polyvalent metal ions if these change their charge through complex formation in the autoprotolysis of the aqua-complexes.

$Ga^{3+}$ forms and strong hydrate complexes besides stable tetrahalogeno-complexes. Brendler (I. Brendler et al.: "Untersuchung zur Chlorokomplexbildung des Gallium (III)-Kations in wässiger Lösung", Monatshefte für Chemie 123, 1992, p. 285-289) investigated the characteristic Raman spectrum of Ga-tetrachloro complexes at peaks (116, 128, 348 and 381 cm$^{-1}$) in 1,5-molar Ga solution with 0 to 6 mol/l chloride. It was found that with increasing Cl concentration the intensity of the characteristic chloro-complex peak at 348 cm$^{-1}$ increases with chloride concentration, indicating the increase in the $GaCl_4^-$ concentration. The Raman spectrum was not shifted by chloro-complex formation, indicating a lack of stable gallium transition complexes.

Figure 3:
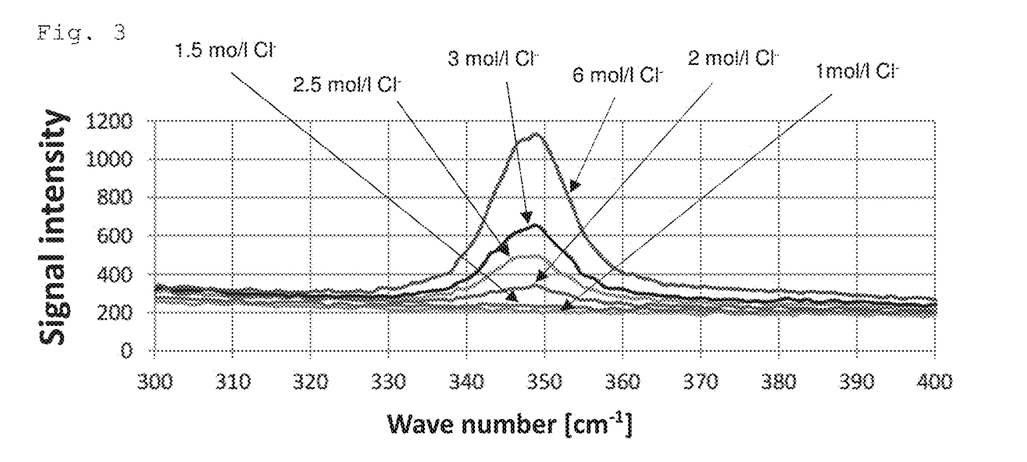

Own Raman measurements within the scope of the present invention (see FIG. 3) have shown that $GaCl_4^-$ is detectable already at a HCl content of 2 mol/l with a strong peak at 348 cm$^{-1}$.

Figure 4:
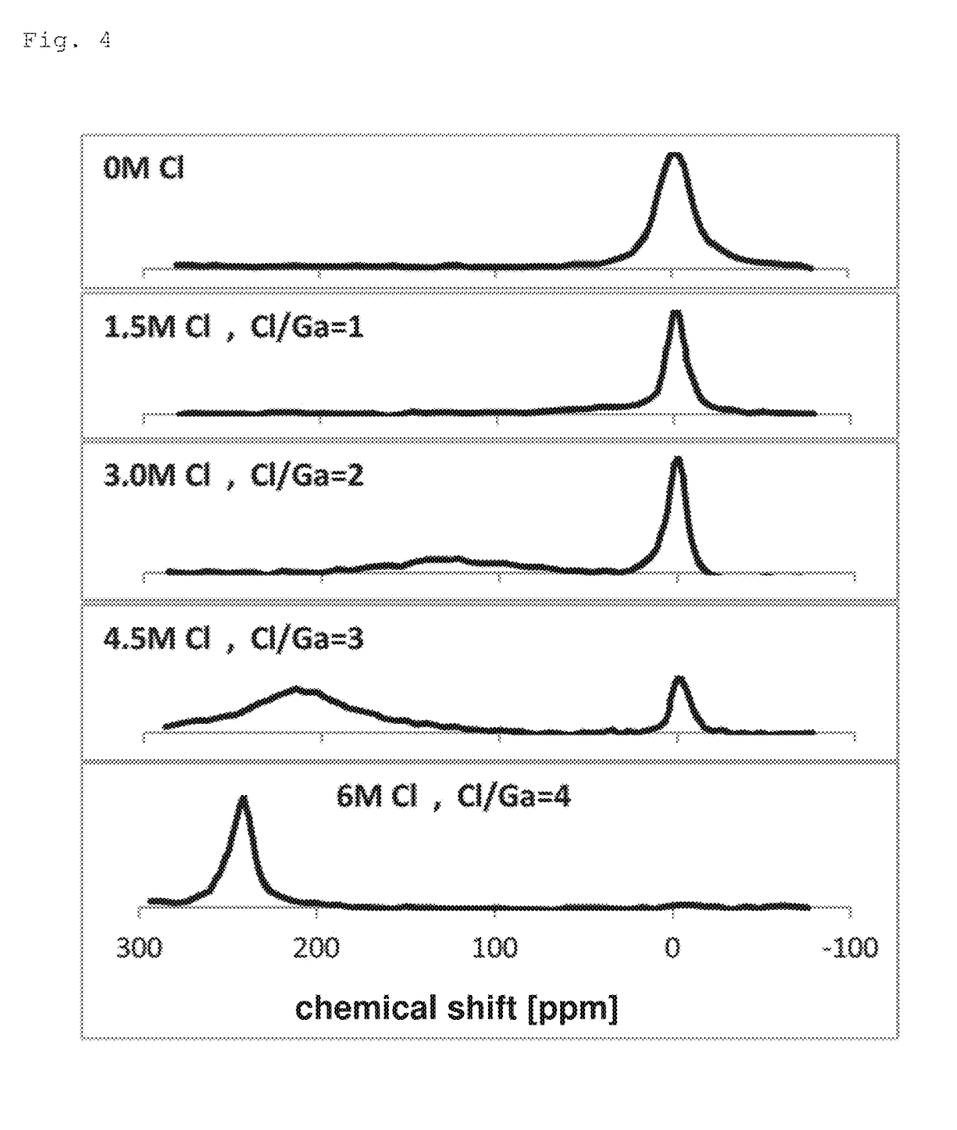

Ocken (E. Ocken: "Untersuchung zur Protolyse und Chloro-Komplex-Bildung des Gallium(III)-Kations", Dissertation at the TU Bergakademie Freiberg, Institut für Inorganische Chemie, 1990, p. 79 ff.) showed by $^{71}$Ga—NMR measurements with 1,5-molar $Ga(ClO_4)_3$-solution that from a concentration of 3 mol/l chloride a further, broad resonance develops beside the characteristic resonance of the aqua-complexes, which narrows with increasing chloride concentration, increases in intensity and changes into the resonance characteristic for the tetrachloro-complex. This suggests a very slow exchange of equilibria between hexaaqua complexes and unknown mixed ligand complexes. The resonance of the tetrachloro-complex is only pronounced from 6 molar chloride solution. Ocken found that the exchange equilibrium with the mixed ligand complexes is faster than with the aqua complex. The equilibrium can be described as follows (see Brendler 1990, p. 99):

This special complex formation behavior in gallium influences the loading of anion exchangers in the $GaCl_3/HCl/H_2O$ system. The NMR results of ocken are shown in FIG. 4.

Figure 5:
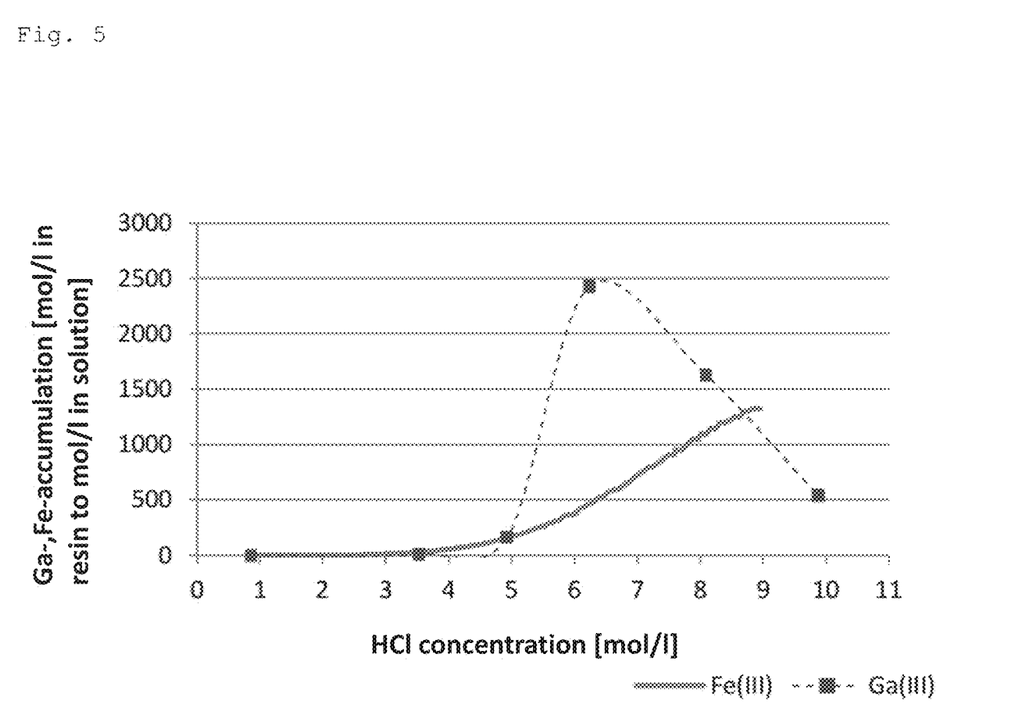

In FIG. 5 (from: E. Ocken: "Untersuchung zur Protolyse und Chloro-Komplex-Bildung des Gallium(III)-Kations", dissertation at the TU Bergakademie Freiberg, Institute for Inorganic Chemistry, 1990), the exchange isotherms of $Ga^{3+}$ and $Fe^{3+}$ at the anion exchange membrane Dowex-1×10 are compared with quaternary amines of type 1, a crosslinking degree of the PS-DVB resin of 10% DVB and an exchange capacity of 3.5 meg/g). The resins were respectively loaded from 0.01 molar solutions. FIG. 5 shows that the exchange isotherm of $Fe^{3+}$ is approximately parabolic, since the Fe-chloro-complexes formed are in equilibrium with each other over a wide Cl-concentration range. For $Ga^{3+}$ the Ga-exchange isotherm only increases steeply from 4.5 mol/l Cl due to the formation of $GaCl_4^-$ until the Ga-complexes are displaced by the excess Cl ions from approx. 6 mol/l Cl. The Ga-exchange, which starts sharply from a certain $Cl^-$-concentration, coincides with the findings of the Raman and NMR measurements described above and is of high relevance for the selectivity of the invention-based membrane process. This invention exploits the described effect by decomposing $GaCl_4^-$ into $Ga^{3+}$ and $Cl^-$ in the membrane by falling below the Cl concentration required for complex formation. Due to the concentration gradient of the chloride ions in the membrane between feed and dialysate, the described effect is strongly pronounced, $Ga^{3+}$ cations, which form in the membrane due to the decomposition of the tetrachloro-complex, cannot pass through the membrane and therefore cannot reach the eluate side.

The effect described for Ga cannot be observed for chloro-complexes of other metal ions such as $In^{3+}$ or $Fe^{3+}$, since the chloro-complexes sorbed by the anion exchange membrane are in equilibrium with each other over a broad Cl concentration range. This allows their permeation of the tetracholoro-complexes through the membrane and into the dialysate. The exploitation of this effect allows the selective separation of Ga from other metals such as In and Fe.

Non-porous, ion-permeable membranes can be used to achieve these effects. The ion exchange resins can be composed of divinylbenzene copolymers or sulfonated fluoropolymers. By chemical modification, anion exchange membranes contain functional groups (fixed ions) with cationic charges that make the polymer swellable and ion-conductive. For example, a membrane was used which contains quaternary amines with short alkyl moieties as functional groups. The ion exchange capacity (IEC) here is about 1.8 meq/g, based on a dry membrane. The membrane consists of PS-DVB polymer, the crosslinking degree of the matrix is below 10% DVB. In addition to the uncoated membrane, a coated anion exchange membrane made of a fluoropolymer with quaternary amines of type 1 is used. In addition to frequent PS-DVB-based membrane polymers, other polymer types are conceivable, e.g. polyacrylic-based polymers.

The process can take place, for example, in multi-chamber cells or plate modules or tube winding modules. The transport resistances of the diffusion boundary layers on both sides can be kept low by a frontal inflow or turbulent overflow.

As already shown in FIG. 1, the dialysis cells can be arranged in cascades. This enables selective separation of the substances to be removed for different concentrations of the complex-forming halides. The individual stages of the cascade can be operated with specific process parameters. These include the selection of the membrane type and membrane area, the volume flows of feed and dialysate and the temperature and, in the case of electrodialysis, the current density.

The following examples are intended to further illustrate the functionality of the disclosed process:

Example 1

Diffusion Dialysis for the Separation of Ga and as in a Batch Plant

Figure 6A:
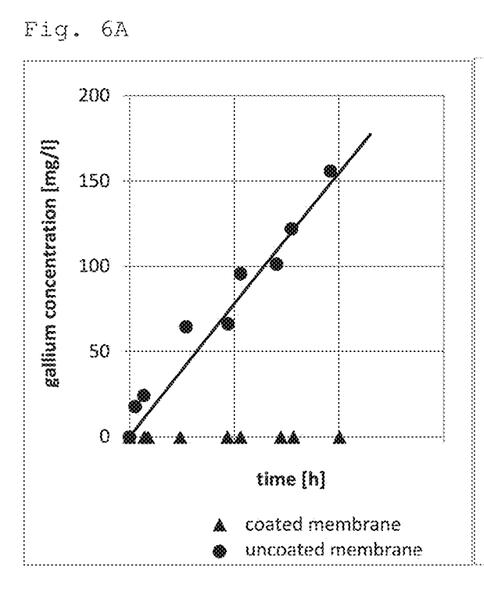
Figure 6B:
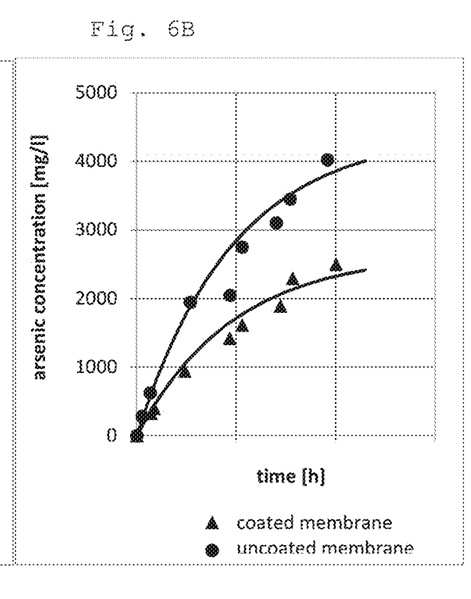

FIGS. 6A-6B compares the concentration curves of gallium and arsenic in dialysate using uncoated and coated diffusion dialysis anion exchange membranes in a batch plant (150 ml feed with 10 g/l Ga ($\approx$0.143 mol/l) and 11 g/l As ($\approx$0.147 mol/l) and an initial chloride concentration of 2.2 mol/l; 1; 230 ml dialysate; 8 cm$^2$ membrane area). The coated membrane is of the Selemion APS4 type. It is based on a polysulfone skeleton with quaternary amines and is coated on the feed side. The uncoated membrane is of the Neosepta AFN type and is based on a PS-DVB resin with quaternary amines of type 2.

Example 2

Ga—as Separation in a Continuous Countercurrent System

Figure 7:
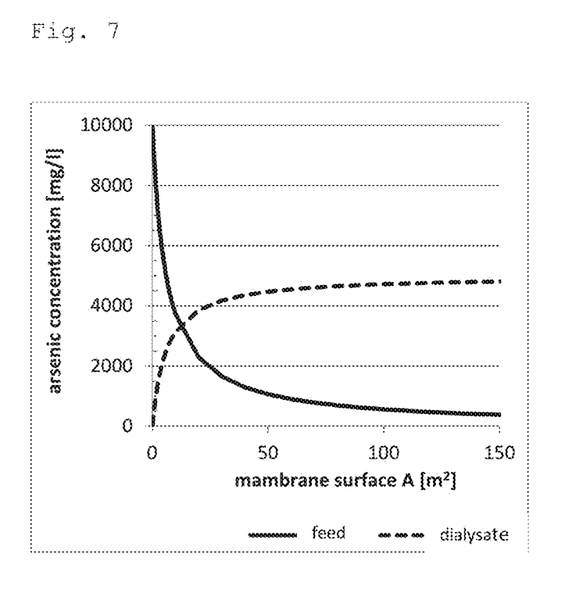

FIG. 7 shows the design of a continuous countercurrent dialysis system. The gallium concentration in the dialysate remains below 5 mg/l ($\approx$20.072 mmol/l). For a feed flow of 280 1 per day and 10 g/l ($\approx$0.143 mol/l) Ga and 10 g/l As ($\approx$20.133 mol/l) and at an initial chloride concentration of 2 mol/l, the target concentration of 0.5 g/l ($\approx$0.0067 mol/l) As can be undershot if the membrane area is 100 m$^2$ and the dialysate wastewater flow is twice as high as the feed volume flow.

Example 3

Separation of Ga and in in Chloride-Containing Solution

Figure 8:
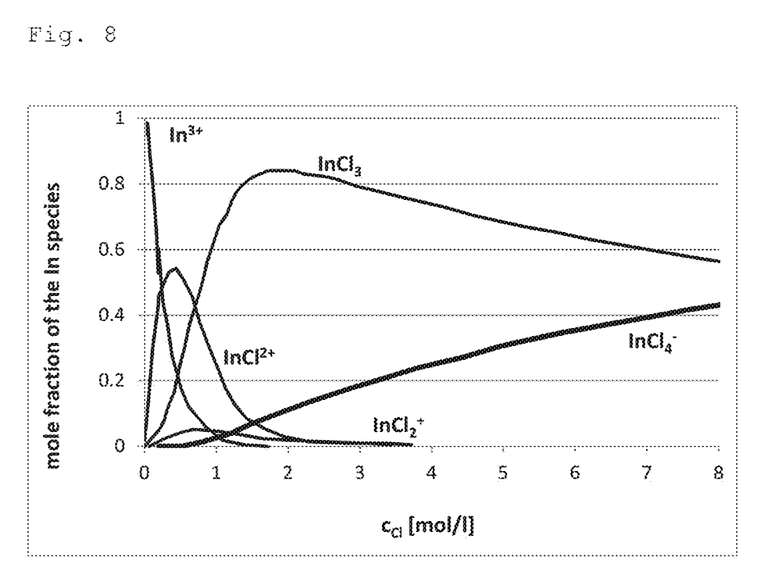

FIG. 8 shows the dependence of the mole fraction of the indium(III)-chloro-complexes on the Cl concentration in an equilibrium. The initial concentration of In was 0.25 mol/l at 25° C. and a pH value <2. The values are taken from: P Kondziela, J. Biernat (1975): "Determination of stability constants of Indium Halogenide complexes by Polarography", Electroanalytical Chemistry and Interfacial Electrochemistry 61, pp. 281-288, and I. Puigdomenech (2013): "Hydra-Medusa", software with database for the calculation of chemical equilibria, software version August 2009, database version January 2013.

Here it becomes clear that an indium-tetrachloro-complex is already formed at a chloride concentration of 0.5 mol/l and above.

Figure 9:
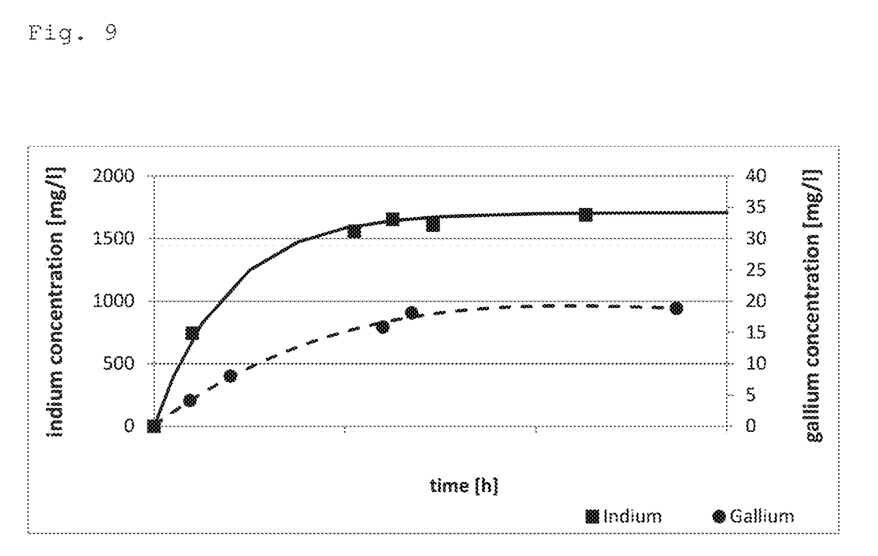

FIG. 9 shows experimental results of a separation of Ga and In. Here the concentration curves of indium and gallium in the dialysate are compared.

In both experiments an HCl solution with a concentration of 5 mol/l HCl was used as feed, with indium and gallium present as chloro-complexes. In the experiment with Ga an initial concentration of 0.15 mol/l Ga was used, in the experiment with indium an initial concentration of 0.06 mol/l In was used. InCl$^{4-}$ is already stable in 0.5 mol/l HCl (cf. stability diagram of indium chloro complexes in FIG. 8) and thus has a greater stability than GaCl$_4$—. Thus, InCl$_{4-}$ can pass through the membrane much more easily than the corresponding gallium complex. The Ga transport from hydrochloric acid solution is therefore much slower than the In transport.

Example 4

Separation of Ga and Fe in Chloride-Containing Solution

Figure 10:
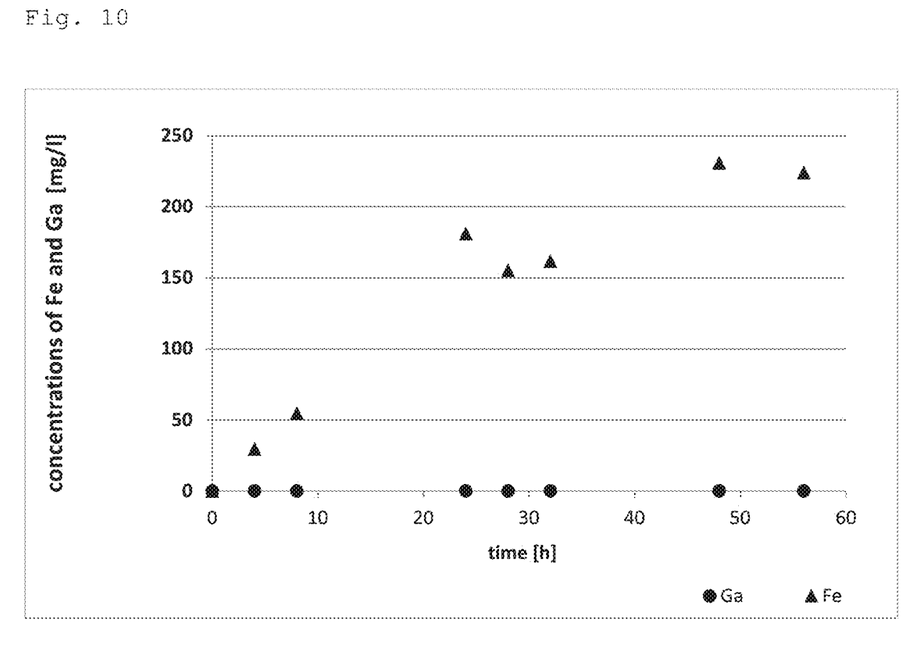

FIG. 10 shows experimental results of a separation of Ga and Fe. Here the concentration curves of iron and gallium in the dialysate are compared. The experiment was carried out in a two-chamber cell equipped with a Selemion DSV membrane with an area of 25 cm$^2$. The feed volume was 200 ml and the dialysate volume 300 ml. The following initial concentrations were present in the feed: $c_{Fe}$=4 g/l ($\approx$0.072 mol/l), $c_{Ga}$=0.5 g/l ($\approx$0.0072 mol/l), $c_{Cl-}$=1.8 g/l ($\approx$0.005 mol/l). However, the number of chloride ions already present in the feed solution as complexes of Ga and Fe cannot be quantified here.

In this example, lower Ga concentrations are used than in the above example. Hence, also the minimal concentration of Cl$^-$ is respectively lower.

The invention claimed is:
1. A process for separating gallium from impurities in an aqueous solution, the process comprising:
performing a dialysis procedure between a feed solution and a dialysate separated by an anion exchange dialysis membrane, wherein:
the feed solution is acidic and comprises anionic halide ions and cationic gallium ions in the feed solution in respective concentrations suitable for formation of anionic gallium halide complexes and wherein the concentration of the anionic halide ions is at least two moles per liter;

the impurities comprise one or a combination of two or more of: an arsenic species, an iron species, and an indium species; and wherein the anionic gallium-halide complexes are selectively retained in the feed solution by the membrane and the impurities pass through the membrane into the dialysate.

2. The process according to claim 1, further comprising:
maintaining a sufficient halide concentration gradient at the membrane between the dialysate and the feed solution so that the anionic gallium-halide complexes formed in the feed solution disintegrate into constituent cationic gallium ions and anionic halide ions when sorbed in the membrane and prevent the gallium ions from passing through the membrane.

3. The process according to claim 2, wherein the impurities comprise the iron species and/or indium species.

4. The process according to claim 3, wherein the iron species and/or indium species comprise anionic halide complexes comprising cationic iron ions and/or cationic indium ions, wherein the anionic halide complexes remain stable when sorbed into the membrane and pass through the membrane into the dialysate.

5. The Process according to claim 4, wherein the anionic halide complexes comprise tetrahalogeno-complexes $MX_4^-$ wherein X=Cl or Br and M=In or Fe.

6. The process according claim 1, wherein the impurities comprise the arsenic species.

7. The process according claim 6, wherein the arsenic species comprises an arsenic acid in an anionic form as $H_2AsO_4^-$.

8. The process according to claim 1, wherein the concentration of the gallium ions in the feed solution is 0.3 moles per liter or less.

9. The process according to claim 1, wherein the anionic gallium-halide complexes comprise gallium-tetrahalogeno complexes.

10. The process according to claim 1, wherein the halide ions comprise bromide ions.

11. The process according to claim 1, wherein the halide ions comprise chloride ions.

12. The process according to claim 11, wherein the gallium-halide complexes comprise gallium-chloro-complexes.

13. The process according to claim 12, wherein the gallium-chloro-complexes comprise gallium-tetrachloro complexes.

14. The process according claim 1, wherein the feed solution comprises a hydrogen halide acid.

15. The process according to claim 14, wherein the feed solution further comprises a nitric acid.

16. The process according to claim 1, wherein the feed solution has a pH value of $\leq 3$.

17. The process according to claim 1, wherein the feed solution has a pH value of $\leq 2$.

18. The process according to claim 1, wherein the anion exchange dialysis membrane comprises:
a backbone comprising a copolymer having a degree of crosslinking; and
a modification of a membrane layer at least on the feed side of the membrane, the modification being one or a combination of two or more of:
having a higher degree of crosslinking than the backbone of the membrane;
impregnating a surface of the membrane with weakly basic anion exchange groups; and
a targeted control of membrane synthesis.

19. The process according to claim 1, further comprising applying an external electric field to the feed solution and the dialysate to superimpose an additional electric potential gradient between the feed solution and the dialysate.

20. The process according to claim 1, wherein the dialysis is performed in continuous countercurrent mode.

* * * * *